United States Patent [19]

Becker et al.

[11] Patent Number: 4,838,778
[45] Date of Patent: Jun. 13, 1989

[54] COEXTRUSION HEAD

[76] Inventors: Rudolf Becker, Kornradenstrasse 32, West Berlin; Wilhelm Neubauer, Birkenstrasse 25, 7141 Oberstenfeld, Gronau; Hans Beyer, Malteserstrasse 48, D-1000 Berlin 46; Harald Pohl, Kottbusser Damm 79, D-1000 Berlin 61, all of Fed. Rep. of Germany

[21] Appl. No.: 136,964
[22] Filed: Dec. 23, 1987
[30] Foreign Application Priority Data Jan. 7, 1987 [DE] Fed. Rep. of Germany ....... 3700237

[51] Int. Cl.$^4$ ............................................. B29C 47/04
[52] U.S. Cl. ................................. 425/133.1; 425/462; 425/532
[58] Field of Search ...................... 425/133.1, 532, 462, 425/467; 428/36; 264/176.1, 209.1, 209.8

[56] References Cited

U.S. PATENT DOCUMENTS

| 3,962,396 | 6/1976 | Ono et al. | 425/532 X |
| 4,167,383 | 9/1979 | Murakami et al. | 425/133.1 X |
| 4,185,954 | 1/1980 | Murakami et al. | 425/133.1 X |
| 4,226,522 | 10/1980 | Yoshikawa et al. | 425/133.1 X |
| 4,297,092 | 10/1981 | Goron | 425/532 X |
| 4,522,775 | 6/1985 | Briggs et al. | 425/133.1 X |
| 4,717,326 | 1/1988 | Motonaga et al. | 425/462 X |

FOREIGN PATENT DOCUMENTS 54-15891  6/1979  Japan ..................... 425/133.1

Primary Examiner—Richard L. Chiesa
Attorney, Agent, or Firm—Robert A. Miller; Penrose Albright

[57] ABSTRACT

A coextrusion head for the continuous production of laminated tubes to be used as parisons in blow molding. The tubes consist of a plurality of layers of synthetic resins. The synthetic resin layers include one or more supporting layers, usually a barrier layer, and adhesive layers as necessary. The layers are brought together by axial, annular feed passageways within the coextrusion head prior to the laminated tube being extruded through a nozzle in the head. Frequently one layer, generally the barrier layer, has different flow characteristics than those of the other layers, whereupon structural defects can arise in the formed tube. The apparatus described forestalls such structural defects by feeding the various layers into confluence in a manner that precludes, or sufficiently minimizes, the time layers having differing flow characteristics have contact with feed passageway walls while in confluence. As a result, shear stresses within or between the individual layers is avoided and the tube so produced is free of structural defects.

6 Claims, 3 Drawing Sheets

COEXTRUSION HEAD

FIELD OF INVENTION

The invention relates to a coextrusion head for the continuous production of extruded tubes, consisting of multiple layers of synthetic resin, to be used as parisons in blow molding. The multiple layers usually include one or more supporting layers, one or, on occasion, more barrier layers and adhesive layers between the supporting and barrier layers. The layers of the tube are formed in the extrusion head in coaxial, annular feed passageways that are fed from associated extruders, and flow in confluence with one another, before the completed tube is discharged through a nozzle. The invention especially pertains to those instances, prevalent in practice, in which the individual layers described above have different chemical and physical properties. The supporting layers should provide the necessary strength and structure to the final product produced in a blow mold. The purpose of the barrier layer is to prevent the escape, or diffusion, of a portion of the contents placed within the final molded product. The barrier layers is usually of a relatively expensive material and, because of the cost, should be as thin as possible. It is frequently difficult to bond the barrier layer directly to supporting layers. Thus, an adhesive layer, which likewise should be quite thin, is generally arranged between the barrier and supporting layers.

BACKGROUND OF THE INVENTION

In known coextrusion heads, the layers of synthetic resin are joined in stages, are transported together as their volume increases, and then are combined into one single tube, which is extruded from the head's nozzle. This method of production can result in a nonuniform tube structure, in which the adjacent layers buckle, have an uneven thickness, are separated, or the converse, become intermixed.

That a wide range of uses and articles can be produced, by blow molding, from multilayered parisons is due to the large number of arrangements and compositions of the individual layers. The introduction of a barrier layer expands the range of uses to those where it is necessary to prevent the diffusion of the contents, or portions of the contents, through the finished container. The arrangement and composition of the barrier layer depends upon the material whose escape is to be prevented. In addition, article strength, resistance and cost play important roles, as does esthetics, in the composition of the finished container. For instance, the desired outside luminosity, or glow, might influence the type and positioning of one or more layers in the composite. Generally the barrier layer, consisting of materials such as ethylene-vinyl-alcohol (EVOH) or polyamide (PA), and the supporting layers, for example made of polyethylene (PE) or polypropylene (PP), may have different physical properties which include differing flow characteristics. The adhesive layer, on the other hand, generally has the same basic molecular structure as the associated supporting layer. As a result, these two layers generally have similar physical properties to include similar flow characteristics.

In known coextrusion heads, the annular passageways, one for each synthetic resin layer, are spaced apart from one another where they join the inner main feed passageway. As an example, a 'standard' coextrusion head will first have the inner supporting layer fed into the main passageway. Next, an inner adhesive layer is added and then the barrier layer material is joined to the flow. Before the outer adhesive layer, and subsequently, the outer supporting layer, is fed into the flow, the laminate consisting of the inner supporting layer, the inner adhesive layer and the barrier layer are transported a considerable distance in the feed passageway. During this passage, the inner supporting layer and the barrier layer are in contact with the boundary walls of the feed passageway. The different flow characteristics of these two layers lead to high shear stresses both within each layer and between the individual layers. The aforementioned structural defects within the extruded tube are the result of these shear stresses. Thus, the articles produced from such extruded tubes are of a lower quality.

U.S. Pat. 4,522,775, issued June 1, 1985, discloses a coextrusion head of this known type. The various synthetic resin layers are fed into the inner main feed passageway at an axial spacing from one another. In addition, both adhesive layers and the barrier layer are joined prior to the merger with the inner supporting layer. Although the disclosed configuration may simplify the joining of the thin barrier layer and its inner and outer adhesive layers with the quite thick inner supporting layer, it does not avoid the possible structural defects resulting from the different flow characteristics of the adhesive layers and the barrier layer. The disclosed coextrusion head continues to transport a laminate formed of an adhesive layer and a barrier layer a considerable distance within a feed passageway thereby introducing the shear stresses resulting from differing flow characteristics as the inner adhesive layer and the barrier layer each engage one of the boundary walls of the feed passageway as they move toward the junction where the outer adhesive barrier is joined.

SUMMARY OF THE INVENTION

An object of the present invention is to produce a coextrusion head that avoids the structural defects in the extruded tube noted above. The construction of the coextrusion head avoids the differing flow resistances, of the laminated layers during passage of the material through the main feed passageway, which can result in shear stresses between layers. A layer, e.g., the barrier layer, which has different flow characteristics than those of the other layers, such as the adhesive layers, is fed from its associated feed passageway either directly between two adhesive layers or travels only a very short distance prior to being covered by a second adhesive layer ont he side opposite the first adhesive layer. In the first case, the feed passageways associated with the inner adhesive layer, the barrier layer, and outer adhesive layer come together at a common junction. In the second, or latter, case, the distance travelled after the inner adhesive layer is joined to the barrier layer, before the outer adhesive layer is joined, is so short that the differing flow characteristics do not produce notable shear stresses; thus no structural defects arise in the extruded tube.

By applying adhesive, or coating, layers on both sides of the barrier layer at the same or nearly the same point in the process, the flow characteristics on both sides of the laminate are essentially the same during continued passage in the direction of the discharge nozzle. Also, the distance remaining to be travelled until discharge through the nozzle is such that there is insufficient time for the barrier layer to penetrate into either adjacent adhesive layer.

Another object of the invention is that the feed passageways carrying the adhesive layers to the common junction with the barrier layer are already conducting the associated supporting layer. The joining of the supporting layers with their associated adhesive layers prior to arrival at the common junction with the barrier layer, or to the separate, but axially adjacent and proximately close junctions lying as close to the discharge nozzle of the coextrusion head as possible, minimize the possibility of stress shears. This is particularly important if the inner supporting layer and the inner adhesive layer are of different materials than the outer supporting layer and its associated adhesive layer. If the inner laminate differs from the outer laminate in terms of the flow characteristics, then the short flow distances produce no significant shear stresses within or between the layers even downstream from the common junction or those junctions which are axially adjacent and proximately close to one another.

It is also possible to have the feed passageway conveying the inner adhesive layer to join the feed passageway conveying the inner supporting layer prior to arriving in the vicinity of the junction with the barrier layer and the closely adjacent junction, in the direction of flow, where the feed passageway conducting the adhesive outer supporting layers is fed into the laminate. In this construction, the arrangement of the annular segments of the coextrusion head containing the feed passageways is simpler since not all of the feed passageways run together at one point.

It is also known in the art to incorporate a so-called 'scrap or regrind layer' in the layer structure of a coextruded tube. A 'scrap' layer is made up from the refined scrap that frequently collects at the neck, the bottom, or other points where excess material occurs during the production of hollow articles from extruded tube-like parisons. The scrap contains supporting, barrier, and adhesive layer material. Thus, a scrap layer can serve as a supporting layer, an additional supporting layer, or under some conditions, because of significant adhesive layer content, as a special adhesive layer. When used as an adhesive layer, at least between this scrap layer and another layer, for example a supporting layer, it makes the traditional adhesive layer dispensable. In the instant invention, when a scrap layer is incorporated into the layer composite, at least one additional feed passageway may be required. When such an additional feed passageway is required, it is placed between the inner supporting layer and inner adhesive layer or the outer supporting layer and outer adhesive layer or a passageway is placed in both locations.

Other objects, adaptions and capabilities of the invention will be appreciated and understood by those skilled in the art from the disclosure herein as well as, of course, reductions to practice conforming to such disclosure, reference being had to the accompanying drawings in which:

DESCRIPTION OF THE PREFERRED EMBODIMENTS

Figure 1:
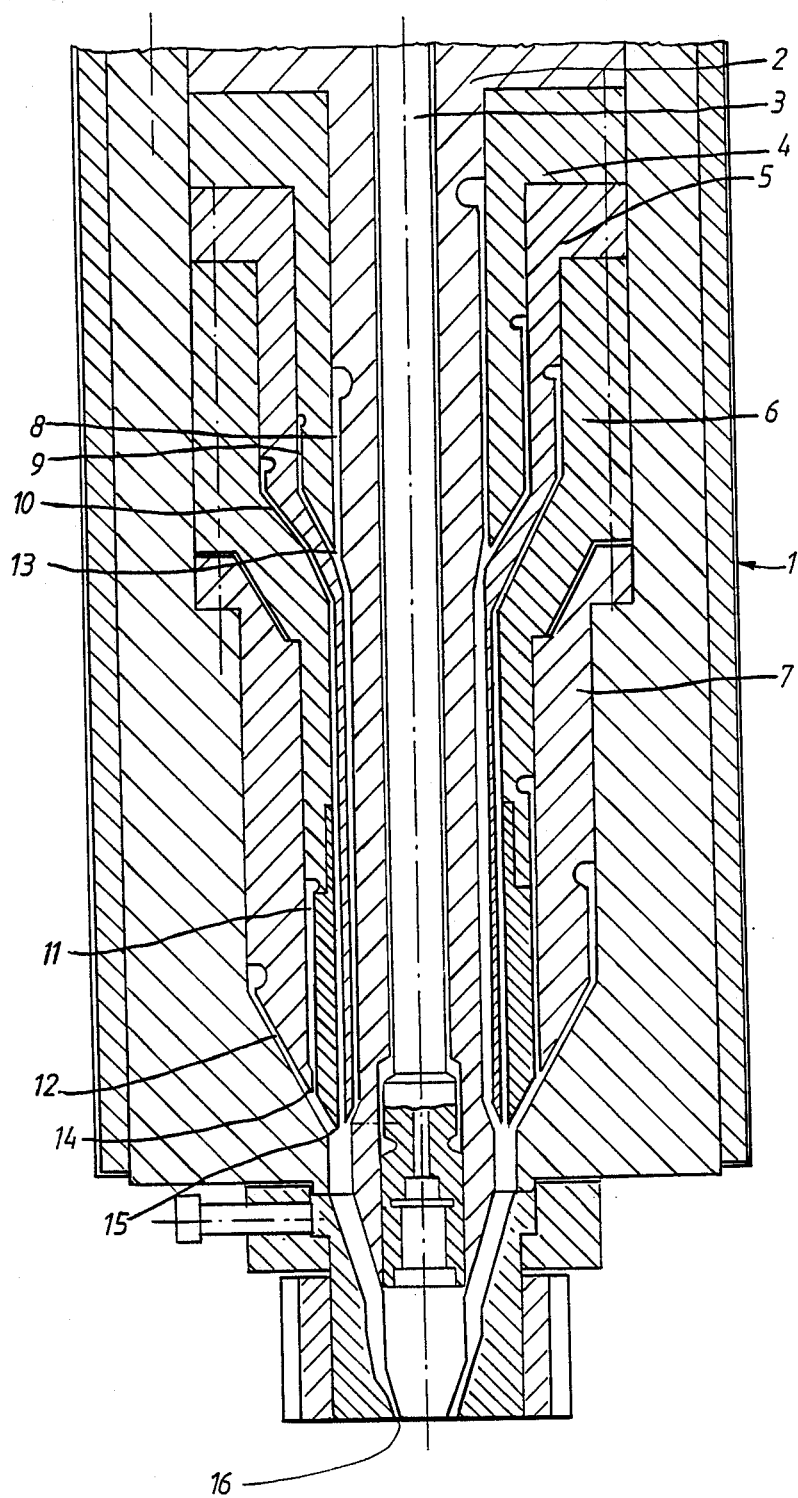
FIG. 1 is a vertical cross-section of the lower portion of a coextrusion head according to the invention containing feed passageways for transporting the individual layers of material.

The lower portion of a first embodiment of coextrusion head 1, which pertains to the invention, is shown in FIG. 1. Annular, or sheath-like, segments 4 to 7 are arranged around a central mandrel 2 surrounding carrying spindle 3. The outer and inner walls of segments 4 to 7 form feed passageways 8 to 12, which are fed in a known manner, using cardioid feeding lines not visible in the drawing, by individual extruders.

Figure 2:
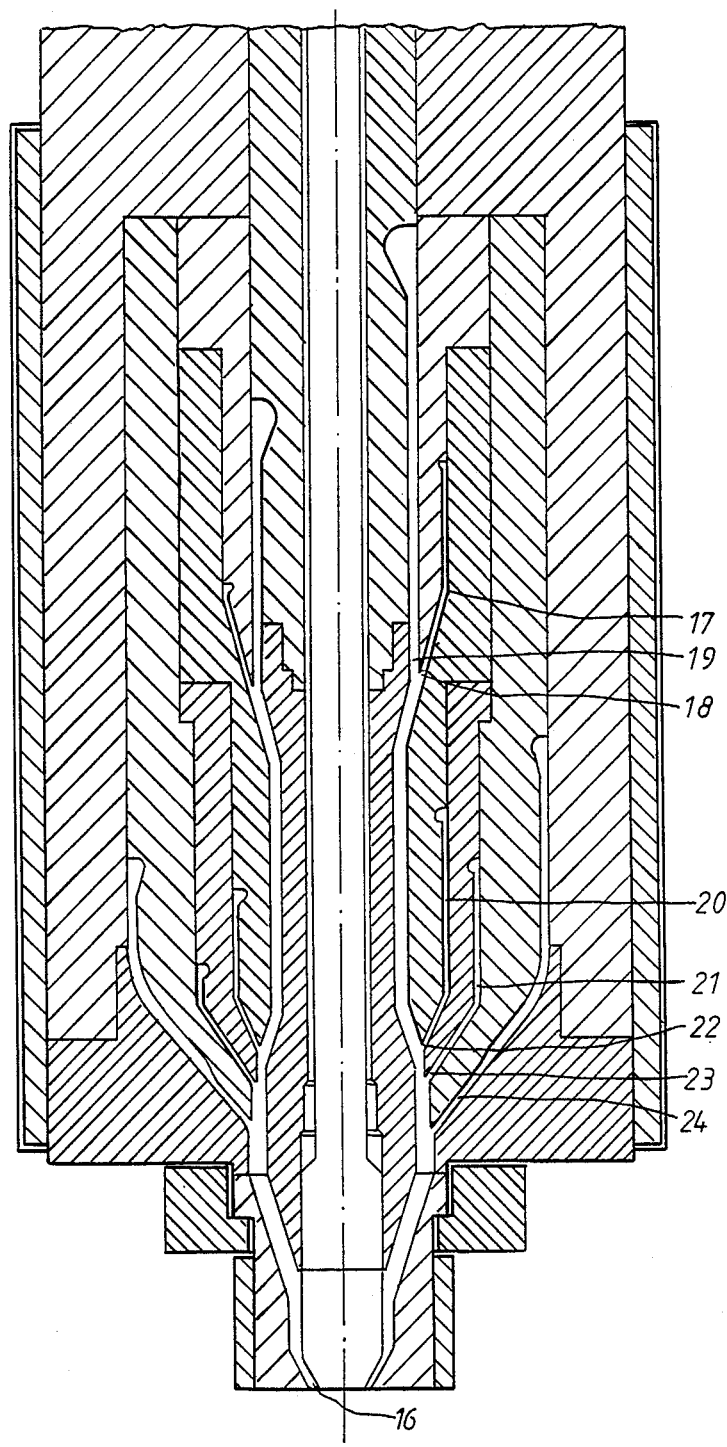
FIG. 2 is a vertical cross-section of a second embodiment of the invention.
Figure 3:
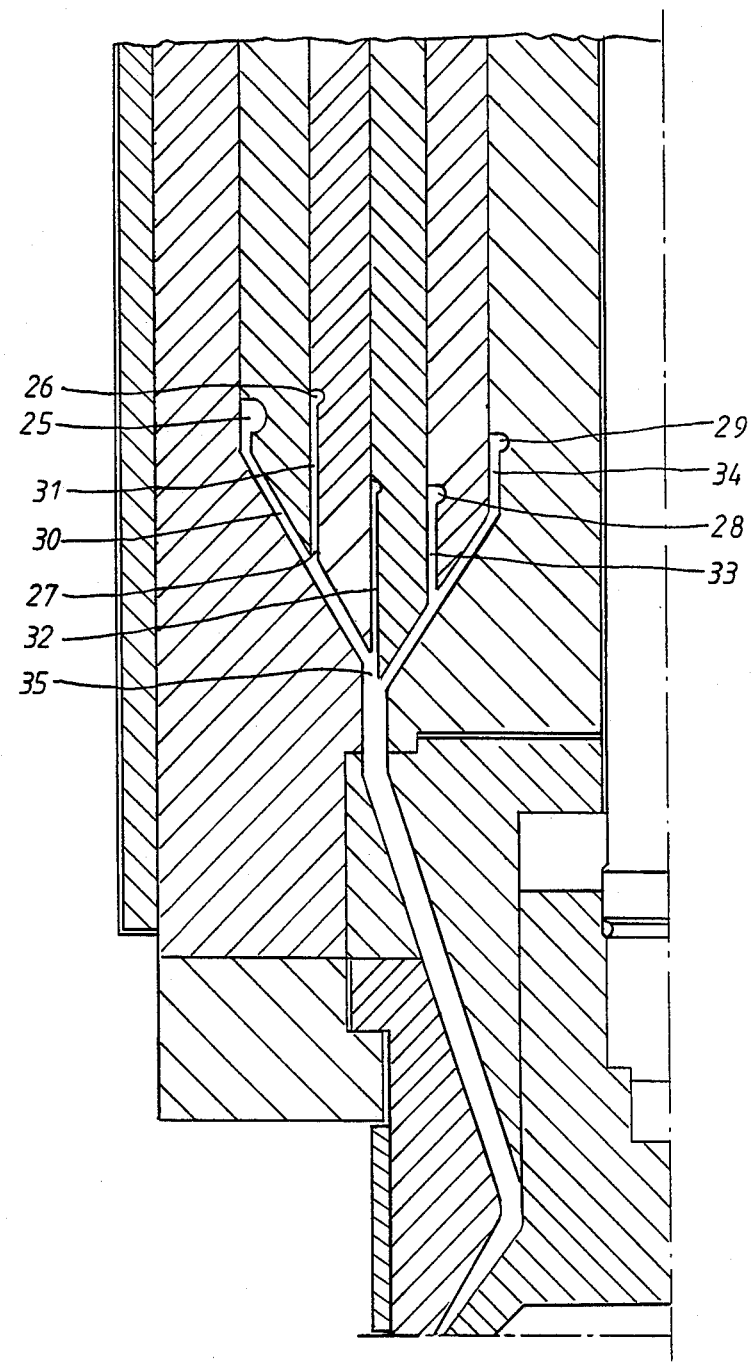
FIG. 3 is a vertical cross-section of one-half of a further embodiment.

The preferred laminate structure is one of five layers, thus the embodiments which are described and shown in FIGS. 1-3, produce the preferred structure. In FIG. 1, the arrangement of feed passageways 8 to 12, in a sequential order, combine to produce a laminate comprising an inner supporting layer, an inner adhesive layer, a middle barrier layer, an outer adhesive layer and an outer supporting layer. The inner adhesive layer, flowing in feed passageway 9, feeds into feed passageway 8 in which the inner supporting layer is flowing at junction 13. The two-layer laminate continues to flow through feed passageway 8 to junction 15. The outer supporting layer flows through feed passageway 12 to join the outer adhesive layer flowing in feed passageway 11. At junction 14 they are joined to form a second two-layer laminate. The inner laminate, which is formed at junction 13, the barrier layer flowing in the feed passageway 10 and the outer laminate, formed at junction 14, are joined at common junction 15, where the barrier layer is 'sandwiched', or sealed, between the two adhesive layers. Junction 15 lies in the vicinity of the discharge nozzle 16, from which the completed multi-layer laminated tube is extruded. Since the barrier layer is immediately sealed between the two adhesive layers and their associated supporting layers upon its discharge from feed passageway 10, it no longer has contact with a feed passageway boundary wall. As a result, the differing flow characteristics of the barrier layer, from that of the adhesive or supporting layers, is overcome. Because the barrier layer has no contact with a boundary wall, after joining the adhesive layers, no shear stresses are generated within the layers or between the individual layers. Although this embodiment discloses a five-layer laminate of 'pure' materials, a scrap layer can be used instead of a supporting layer or can be an additional layer.

In the embodiment shown in FIG. 2, the inner adhesive layer flowing in feed passageway 17 joins the inner supporting layer flowing in feed passageway 19 at junction 18. The barrier layer, outer adhesive layer and outer supporting layers are then serially, or sequentially, fed into feed passageway 19. The barrier layer, flowing in feed passageway 20, is fed into feed passageway 19 at junction 22 and the outer adhesive layer, flowing in feed passageway 21, at junction 23. The extremely close proximity of junctions 22 and 23 ensures that the differing flow characteristics of the barrier layer and the inner supporting layer, during the flow from junction 22 to junction 23, at which point the barrier layer is covered by the outer adhesive layer, are effectively nullified. The outer supporting layer is then fed from feed passageway 24 so that the multilayered laminate tube to be produced is assembled shortly before extrusion from nozzle 16.

In the embodiments of FIGS. 1 and 2, the layers of material having identical or nearly identical molecular structure, the adhesive and supporting layers, formed in passageways 12 and 11, or 21 and 24, are formed at a large axial distance from the other layers 9 and 8, or 19 and 17, of identical or nearly identical molecular structure. If the passageways are arranged in the coextrusion head in such a separated manner, it is possible to distribute the different extruders along the entire length of the head without producing stress shears in the final product.

However, as shown in FIG. 3, with a suitable construction of cardioid feeding lines, it is also possible to have sufficient axial spacing along the length and around the circumference of the head for placement of the extruders so that the reservoirs 25 to 29 may be placed adjacent to one another and above associated feed passageways 30 to 34. The result is considerably shorter flow distances for each layer as well as shorter confluent stretches of flow for the laminated adhesive and supporting layers. As shown, the adhesive layer flowing in feed passageway 31 is fed onto outer supporting layer flowing in feed passageway 30 to produce the outer layer laminate. The outer layer laminate continues to flow through feed passageway 30 to near junction 35 where the barrier layer is fed from feed passageway 32 onto the flow. A very short distance must be traversed before arriving at junction 35, where the barrier layer is covered on the inside by the inner laminate of adhesive and supporting layers originating in feed passageways 33 and 34 respectively. The resulting multi-layer laminate then is conducted to the discharge nozzle and extruded.

All embodiments of the invention shown and described herein, have in common that the layer (or layers) having different flow characteristics from those of the other layers, is transported for, at most, a negligibly short distance in contact with a wall segment of a feed passageway when laminated on only one side. The result is that shear stresses produced in the individual layers or between the layers, common in known coextrusion heads, are totally avoided, and the multi-layer laminated tube which is finally extruded is completely free of structural defects.

With the fear of structural defects, principally within the barrier and adhesive layers and consisting of buckling or uneven thickness in the layer structure, overcome, the thinner the construction of these layers can be, is also a goal of the invention as it reduces costs.

Having disclosed our invention, what we claim as new and to be secured by Letters Patent of the United States is:

1. In a coextrusion head for the continuous production of coextruded tubes having a plurality of layers of synthetic resin including at least an inner supporting layer, an inner adhesive layer, a middle barrier layer, an outer adhesive layer and an outer supporting layer to be further worked as parison blanks in blow molding, the improvement comprising:
   a central mandrel:
   a plurality of annular, sheath-like segments surrounding said central mandrel, the walls of said annular sheath-like segments forming at least five coaxial annular feed passageways for carrying the synthetic resin layers being fed from associated extruders;
   a plurality of junction points; and
   a discharge nozzle;
   wherein a first feed passageway for the barrier layer, deviating in molecular structure from the adjacent adhesive layers in flow characteristics, and a feed passageway each for the inner and outer adhesive layers to be applied to the barrier layer on both sides, are joined at axially adjacent and proximately close junction points.

2. A coextrusion head, according to claim 1, wherein said feed passageway containing said inner adhesive layer in the vicinity of said axially adjacent and proximately close junction points is already joined with a feed passageway conducting an inner supporting layer, while a feed passageway conducting an outer supporting layer is fed sequentially in the direction of laminate flow.

3. A coextrusion head according to claim 1, wherein said feed passageways transporting said inner and outer adhesive layers in the vicinity of said axially adjacent and proximately close junction points are already joined to an associated supporting layer.

4. A coextrusion head according to claim 3, wherein said axially adjacent and proximately close junction points are located near said discharge nozzle.

5. A coextrusion head according to claim 4, further comprising at least one additional feed passageway for a scrap layer between a supporting layer and an adhesive layer.

6. A coextrusion head according to claim 4, wherein said axially adjacent and proximately close junction points are a common junction point.

* * * * *